United States Patent [19]

Dupont et al.

[11] Patent Number: 6,082,941
[45] Date of Patent: Jul. 4, 2000

[54] TORQUE-LIMITING FASTENER

[75] Inventors: Paul Robert Dupont, Andover; Lindsay Conner, Glen Rock; Jason Westling, Ogdensburg, all of N.J.

[73] Assignee: Rubber-Fab, Inc., Andover, N.J.

[21] Appl. No.: 09/233,162

[22] Filed: Jan. 18, 1999

[51] Int. Cl.[7] .................................................. F16B 31/00
[52] U.S. Cl. .................................................. 411/7; 411/911
[58] Field of Search .......................... 411/1–8, 11, 12, 411/432, 911, 533

[56] References Cited

U.S. PATENT DOCUMENTS

| | | |
|---|---|---|
| 3,273,443 | 9/1966 | Rubin ............................................. 411/7 |
| 3,383,973 | 5/1968 | Gazal ............................................. 411/1 |
| 3,929,054 | 12/1975 | Gutshall . | 
| 4,046,052 | 9/1977 | Nordstrom . |
| 4,512,697 | 4/1985 | Cascini ............................................. 411/7 |
| 4,898,429 | 2/1990 | Plumer ............................................. 411/533 |
| 5,297,429 | 3/1994 | Brown . |
| 5,653,481 | 8/1997 | Alderman . |

FOREIGN PATENT DOCUMENTS 108532  8/1917  United Kingdom ........................ 411/6

*Primary Examiner*—Flemming Saether
*Attorney, Agent, or Firm*—Howard R. Popper

[57] ABSTRACT

A torque-limiting fastener in which a threaded member having a drivable head portion is rotationally mounted within a capsule containing a calibrated spring loading element which is adapted to be compressed in one direction of rotation and released in the opposite direction of rotation, the capsule frictionally engaging the drivable head portion in the one direction of rotation until the compressed spring element exerts sufficient axial force to overcome the frictional engagement between the capsule and the drivable head.

1 Claim, 2 Drawing Sheets

TORQUE-LIMITING FASTENER

FIELD OF THE INVENTION

This invention relates to fasteners and, more particularly to fasteners adapted to limit the amount of force which the fastener can apply to articles being coupled together.

BACKGROUND OF THE INVENTION

The joint between articles being coupled together, such as at the flanges terminating respective sections of fluid-carrying pipes, often must be sealed against leakage by the use of some type of gasket. The gasket material to be used must have appropriate resiliency and resistance against deterioration by the chemical and physical characteristics of the fluid, under the operating conditions of temperature and pressure to which the gasket will be exposed. When the pipes being coupled are to be used in sanitary or hygienic conditions additional criteria come into play such as ISO 2853 relating to stainless steel threaded couplings for the food industry that establish what steps must be taken to safeguard the sanitary conditions. The development of new products and processing methods often imposes increasingly strict requirements on operating conditions causing the coupling to be operated at the limit of its capability with an increasing risk of failure from the hygienic as well mechanical point of view. A 1995 report prepared by the Subgroup Pipe Couplings of the European Hygienic Equipment Design Group entitled "Hygienic Couplings" deals with the problems of joint sealing against contamination by microorganisms. Among the points made in the report is that, to provide a bacteria-tight seal, valleys in the surface profile of the coupling joint must be filled by the elastomeric gasket material, typically by tightening the fastening device holding the coupling together, until sufficient contact pressure is applied. If too little contact pressure is applied by the fastening device, valleys in the surface profile will not be adequately filled to prevent accumulation of microorganisms. Empirical data tends to show that with an elastomeric gasket having a Shore A hardness of 70° a minimum contact pressure of 1.5 N/mm² is required. This contact pressure corresponds to an elastomeric gasket being compressed by 15 per cent of its original thickness.

When a gasket is fabricated of elastomeric material, compressing one dimension of the gasket results in expansion of its other dimension, but the total volume of gasket material remains constant. Thus, assuming that a gasket having an original thickness of T is compressed an amount t (by tightening of the fastener), the gasket's width dimension W will increase by an amount w. It is easy to show that the percentage increase in the width dimension may be greater than the percentage decrease in the thickness dimension: The percentage decrease based on the original thickness may be expressed as:

$$\frac{T-t}{T},$$

while the percentage increase based on the original width may be expressed as $$\frac{W+w}{W}.$$

Applying the assumption that the gasket volume will remain constant means that:

$$(W+w)*(T-t) = WT \quad (1)$$

From equation (1) it is seen that the fractional increase in width is given by:

$$\frac{W+w}{W} = \frac{T}{T-t} = \frac{1}{\frac{T-t}{T}} \quad (2)$$

For example, let it be assumed that $$\frac{T-t}{T}$$

is 20%, equation (2) above shows that $$\frac{W+w}{W}$$

will be 25%, i.e., the percentage increase in width is greater than the percentage decrease in thickness. This is important because sanitary standards dictate that this expansion be not so great as to cause undue projection into the pipe lumina as doing so may provide an obstruction or partial dam that could cause material to be accumulated from the fluid stream at the gasket's surface. Accordingly, the industry has recognized that the tightening force applied by the fastening device must be controlled and limited. The most common fastening device is the threaded bolt and nut combination and the conventional way of limiting the force applied to the gasket is to employ a torque wrench which indicates the foot-lbs of torque being applied when the fastener is made up. There are formulae for translating the torque applied to the fastening device to the amount of normal or axial compressive forces applied to the gasket. While the use of a torque wrench is quite common, it would be advantageous to provide a fastener which could be taken up with an ordinary wrench and which would nevertheless result in the desired amount of compressive stress being imparted to the gasket without fear of overstressing the gasket.

SUMMARY OF THE INVENTION

The foregoing and other features of the invention are exhibited in an illustrative embodiment of a torque-limiting fastener in which a threaded member having an integral, notched head portion is adapted to be releasably driven by a spring-loaded, wrenchable driving cap having cam lobes projecting into the notched head. The spring loading between the cap and the threaded member is provided by a stack of disc spring washers retained within a capsule rigidly affixed to the driving cap between a shoulder of the threaded member and a shoulder of the capsule. The cam lobes and notches cause the spring washers to be compressed in one direction of cap rotation and released in the opposite direction of rotation. Compression of the spring washers increases until the compressed spring stack exerts sufficient axial force to overcome the frictional engagement between the lobes of the cap and the notched head of the threaded member.

BRIEF DESCRIPTION OF THE DRAWING

The foregoing and other features of the invention will become more apparent when read together with the drawing in which.

GENERAL DESCRIPTION

Figure 1A:
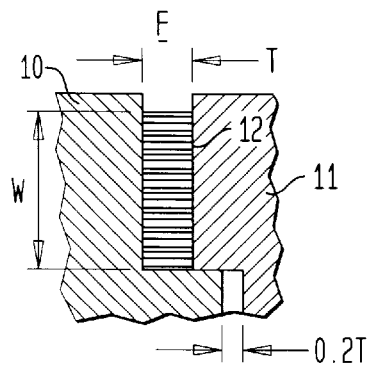
FIGS. 1a, 1b and 1c schematically show a gasket, such as that which may be employed in a conventional sanitary fitting, under varying conditions of compression.
Figure 1B:
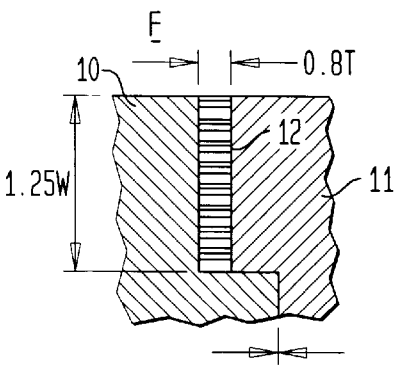

Referring to FIG. 1a, there is shown, in highly schematic form, the gasketed joint between a pair of conventional sanitary pipe fittings having abutting stainless steel face pieces 10, 11. A gasket 12, illustratively of elastomeric material, is shown interposed between the steel face pieces 10, 11 and is intended to seal the joint between the face pieces against leakage of the fluid stream, generally indicated at F. Gasket 12 is shown in FIG. 1a as having an uncompressed thickness T and width W. In FIG. 1b the gasket has been compressed by taking up a fastener (not shown) so that the gasket's thickness between face pieces 10, 11 is reduced by an amount t, illustratively 0.2 T or 20%. FIG. 1b illustrates the example shown with respect to equation (1) above, that the gasket's original width W will increase by a somewhat greater amount w, illustratively 1.25 W or 25%.

Figure 1C:
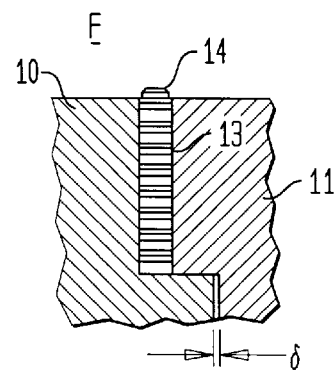

In FIG. 1c the situation is shown where a gasket 13 has been compressed so much that its edge 14 unduly projects into fluid stream F. Such a projection forms a partial dam that may allow solid materials carried in fluid stream F to collect, a situation which is to be avoided if sanitary conditions are to be maintained. Moreover, if the gasket 13 is made of a non-elastomeric material such a PTFE, commonly referred to under the trademark "Teflon", the gasket may be permanently deformed so that backing off of the fastening device will not restore the gasket to its original shape. To avoid the condition shown in FIG. 1c, and to achieve a smooth interface between the gasket and the fluid stream, the compression force applied to the gasket must be carefully controlled. Normally, this is done by using a torque wrench and by using it to take up on the fastening device until the torque wrench indicates that a specified number of inch-pounds obtains. At the specified torque a predetermined compression will be applied to the gasket so that the gasket will properly seal the joint against leakage. It would be advantageous to be able to eliminate the torque wrench so as to permit an ordinary wrench to be used without danger of applying either to little or too much compression to the gasket.

Figure 2:
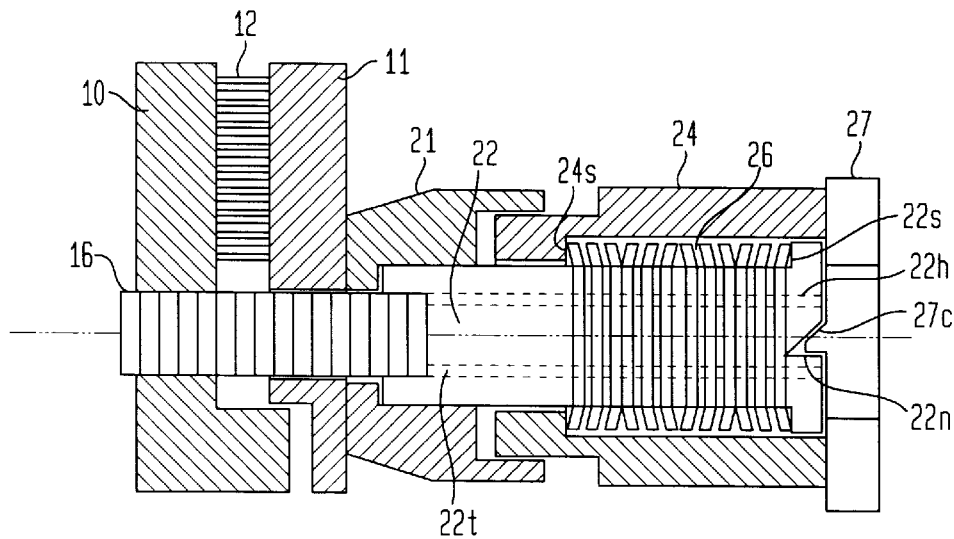
FIG. 2 is a cross-sectional view of an illustrative embodiment of a torque-limiting fastener according to the invention shown about to be made up with a gasketed sanitary fitting.

Referring now to FIG. 2, the face pieces 10, 11 of the pipe fittings and the gasket 12 have been re-drawn, again in highly schematic form. To simplify the illustration, instead of showing a conventional sanitary clamp device such as the well-known tri-clamp, the function of a clamp is symbolized by screw 16 which is assumed to be rigidly affixed to movable face piece 10 while face piece 11 is assumed to stationary and is provided with sufficient clearance to allow screw 16 to freely move therethrough. The fastening device of the illustrative embodiment of our invention includes a threaded, slip shaft member 22 having threads 22t which mate with the corresponding threads of screw 16. At its left-hand end, member 22 is rigidly affixed, such as by shrink fit, to thrust collar or nose piece 21 which bears against face piece 11. At its right-hand end, threaded slip shaft member 22 is provided with a flange the interior surface of which forms a shoulder 22s and the external surface of which forms a head 22h which is furnished with several notches 22n. An end cap 27, advantageously having a hexagonal shape to accommodate the use of a wrench (not shown), is provided with a number of projecting cam lobe surfaces 27c that are adapted to engage the notches 22n of slip shaft head 22h. Rigidly affixed to end cap 27 is sleeve 24 which includes a shoulder 24s. Sleeve 24 is free to turn about member 22 and also free to turn within thrust collar 21. Loosely mounted on slip shaft member 22, between its shoulder 22s and shoulder 24s of sleeve 24, is a stack of disc springs 26, commonly referred to as bellville washers. The number of disc washers 26 and their physical characteristics are selected to produce a desired bolt clamping load as given in handbooks and disc spring manufacturers' catalogs. Bolt clamping load, in turn, may be translated into a corresponding compression factor for a particular gasket made of a given durometer material. Normally the stack 26 completely fills the axial distance between shoulders 24s and 22s. In addition, the axial distance between shoulders 24s and 22s may advantageously be adjusted during assembly to put stack 26 under a predetermined axial stress or pre-load so that cam lobes 27c of cap 27 are just fully seated in notches 22n of member 22.

As end cap 27 is turned to cause threaded member 22 to make up with screw 16, screw 16 and face piece 10 are drawn to the right the distance α, compressing gasket 12 against face piece 11, which is assumed to be stationary. As the torque applied to cap 27 begins to develop sufficient axial thrust, stack 26 will be increasingly compressed and cam lobe 27c will begin to ride out of notch 22n. When a predetermined torque is applied to cap 27, cam lobe 27c will become completely disengaged from notch 22n by the distance β, producing an audible click and preventing any further applied torque to be transmitted from cap 27 to threaded member 22 thereby limiting the axial compression applied to gasket 12.

Figure 3:
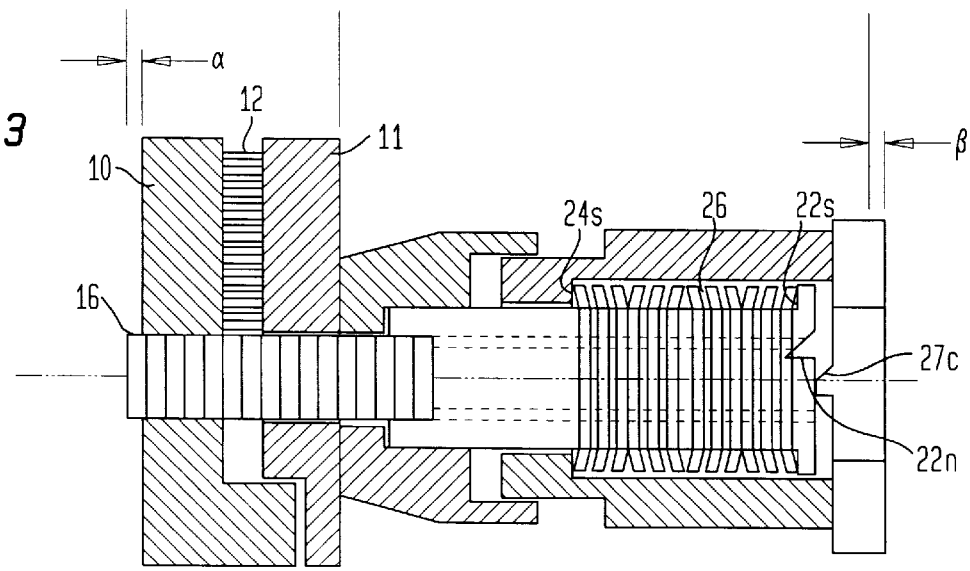
FIG. 3 is a cross-sectional view of the FIG. 2 embodiment shown at the moment when torque limiting takes place to limit gasket compression.
Figure 4:
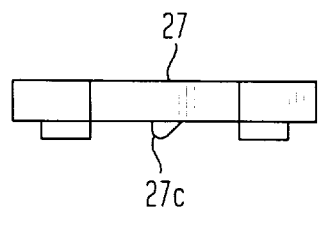
FIGS. 4 and 5 are external side views of the cap and of the slip shaft member showing the cam lobe and notch profiles.
Figure 6:
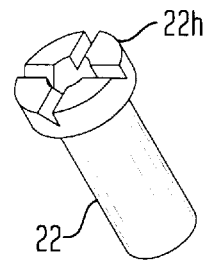
FIG. 6 is an isometric view of the slip shaft member.
Figure 5:
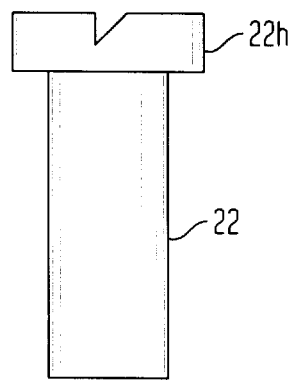
Figure 8:
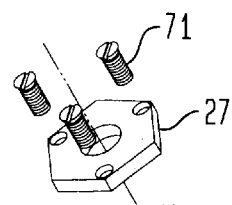
FIG. 8 is an isometric view of the assembled illustrative embodiment.
Figure 7:
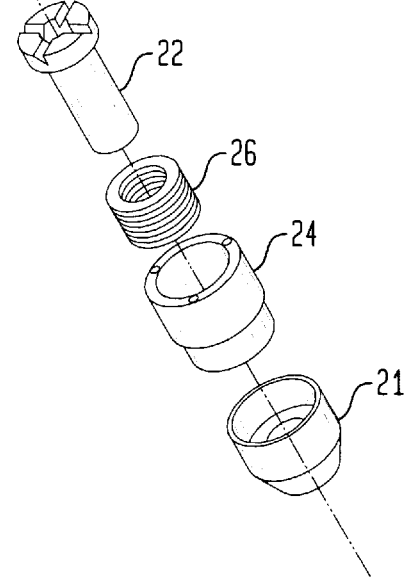
FIG. 7 is an exploded view of the components of the torque limiting fastener of the present invention.

Side view external profiles of the cam lobes of plate 27 and of the notches 22n of slip shaft head 22h are shown in FIGS. 4 and 5 respectively. FIG. 4 shows the asymmetrical shape of the cam lobes 27c each of which has one sloping surface, a rounded nose portion and a substantially steep portion. FIG. 5 shows the asymmetrical V-shaped notches of head 22h. FIG. 6 shows an isometric detailed view of the head 22h of the slip shaft. FIG. 7 shows an exploded view of an illustrative embodiment of the components that were shown in cross-section in FIGS. 2 and 3. In particular, FIG. 7 shows the details of one method of affixing end cap 27 to sleeve 24 through the use of screws through cap 27 into threaded holes in the periphery of sleeve 24.

What has been described is deemed to be illustrative of the principles of the present invention. Numerous modifications may be made by those skilled in the art without, however, departing from the spirit and scope of our invention.

What is claimed is:

1. A torque-limiting fastener comprising a capsule having an internal cam plate and a shoulder, said capsule being adapted to retain a flanged slip shaft having a notched head and a pre-loaded spring stack constrained between said flange and said shoulder, said pre-loaded spring stack exerting an axial thrust between said capsule and said slip shaft; said capsule being rotationally mounted on said slip shaft; said cam plate being adapted to frictionally engage said notched head to compress said spring loading element in one direction of rotation and to positively engage said notched head in the opposite direction of rotation to de-compress said stack; and a thrust collar affixed to said slip shaft, said collar having a cavity for rotationally accommodating said capsule.

* * * * *